United States Patent [19]

Dufour et al.

[11] Patent Number: 5,725,424
[45] Date of Patent: Mar. 10, 1998

[54] MIDDLE SPLITTER

[75] Inventors: Yvon Dufour; Jean-Guy Roy, both of Saint-Anselme; Marcel Couture, St-Henri; Steve LaPointe, Pintembre, all of Canada

[73] Assignee: G. E. Leblanc Inc., Saint-Anselme, Canada

[21] Appl. No.: 800,515

[22] Filed: Feb. 14, 1997

[51] Int. Cl.$^6$ .............................. A22C 17/02; A22C 21/00
[52] U.S. Cl. .............................. 452/160; 452/170; 83/72; 83/360
[58] Field of Search .............................. 452/160, 152, 452/166, 163, 169, 154, 155, 149, 157, 156, 153, 170.171; 83/72, 73, 79, 358, 360, 367

[56] References Cited

U.S. PATENT DOCUMENTS

| | | | |
|---|---|---|---|
| 2,288,010 | 6/1942 | Meland | 452/149 |
| 3,889,567 | 6/1975 | Sato et al. | 83/818 |
| 4,329,896 | 5/1982 | Singer | 83/210 |
| 4,373,232 | 2/1983 | Harding et al. | 452/160 |
| 4,551,885 | 11/1985 | Molnar | 452/170 |
| 4,558,487 | 12/1985 | Vogt | 452/170 |
| 4,868,951 | 9/1989 | Akesson et al. | 452/155 |
| 5,611,727 | 3/1997 | Dufour et al. | 452/153 |

*Primary Examiner*—Willis Little
*Attorney, Agent, or Firm*—Robic

[57] ABSTRACT

A middle splitter for use to split an animal's middle into two parts. The splitter has a work table and a conveyor belt to move the middle forward. The splitter also has a circular saw which extends in a longitudinal slot in the conveyor belt. A guide extends from upstream down to the saw. This guide is parallel and extends above the conveyor belt in order to hold the middle against it. The splitter further has a caterpillar drive which extends before and past the saw. The drive is parallel to the conveyor belt and has a contour belt mounted onto a support of longitudinal shape. The contour belt has protruding plates shaped and positioned to engage the middle. The conveyor belt is driven into rotation by a shaft connected to a motor, so that the side of the contour belt nearest the saw moves forward. As a result, when the motor rotates the belt, the drive pulls the middle forward toward the circular saw for it to be cut. A pressure device is provided to push the drive towards the guide to push on the spine and straighten it up while the middle is cut.

20 Claims, 8 Drawing Sheets

MIDDLE SPLITTER

BACKGROUND OF THE INVENTION a) Field of the Invention

The present invention is concerned with an improvement to the meat processing machines called in the trade "middle splitters", which machines are used in the food industry for splitting middles into loins and bellies.

b) Brief Description of Prior Art

In the meat processing industry, it is of common practice to split the carcass of each processed animal along the spine thereof, in order to divide this carcass into two symmetrical parts, called "middles". Usually, such a splitting is carried out after the shoulders and hinds have been removed.

Each middle which is so obtained, includes half of the longitudinally splitted spine and the adjacent ribs, loin and belly. In order to obtain various cuts for retail purposes such as chops, ribs and fillets, the middle must then be splitted into a loin and a belly by cutting it parallel to the spine. Such a cutting is made with a machine called "middle splitter".

FIG. 1 identified as prior art, is a perspective view of a middle "M" before it is cut into a loin "L" and a belly "B". The cutting line is shown in dotted line.

Traditionally, middles were split manually with a ribbon saw. The middles were guided through the saw by an operator in order to follow the curved shape of the spine. This method, even though efficient, was labor-intensive.

In order to automate the process and obtain a cut that ultimately respects the curved shape of the spine, middle splitters have been devised. Such machines are devised to straighten the spine before it is split, so that the cutting can be accomplished quickly and efficiently with a circular saw.

After the middle is split, the spine recovers its natural curve. This explains why the dotted line shown in FIG. 1 is not straight. Then, the loin portion "L" that has been cut proceeds to another station in order to be cut into a fillet and chops. The belly "B" also proceeds to another station, where the ribs "R" are lifted out. In the case of pork, the remaining belly meat is used to make bacon by first smoking the meat and then slicing it into thin slices using a ribbon saw.

As aforesaid, middle splitters are already used in the industry. They basically comprise a work table onto which a slotted conveyor belt is mounted to move the carcass in a forward direction with the shoulder-adjacent end of the middle positioned forwardly. A circular saw substantially perpendicular to the conveyor belt, extends into the slot provided in the conveyor belt. This saw is positioned in such a manner as to cut the middle laid on the conveyor belt at a distance of 2 inches from the spine of the middle when the middle moves forwards. The middle splitter also includes a guide, parallel to the slot, slightly above the conveyor belt, to hold the middle flat against the conveyor belt while it is cut by the saw.

A driving wheel having peripheral corrugations to engage the middle adjacent the spine, is rotatably mounted near the circular saw to pull the middle toward the circular saw while pushing the spine toward the adjacent guide. This driving wheel which is preferably conical in shape, is powered by a motor. The wheel exerts pressure on the spine by way of pressure-exerting means devised to push the wheel towards the guide to straighten the spine while the middle is cut so that a straight cut may be obtained. After the middle is split, the spine recovers its natural shape. The resulting cut is in practice equivalent to the one an operator would have obtained by manually splitting the middle with a ribbon saw, but with far greater efficiency.

So far, the driving wheel which, as aforesaid, is preferably conical, has a top diameter of approximately 22 inches and a bottom diameter of 16 inches. The bottom part is cylindrical and extends 2 inches towards the conveyor belt, just slightly above it.

If the middle splitters presently in use are efficient, there is still some problems associated with their use.

One problem with middle splitters using a driving wheel is that they do not engage the middles uniformly. Indeed, the tangential point of the driving wheel makes full contact with the middles while a decreasing contact is obtained for points farther away from this tangential point. Such a poor contact reduces the traction of the driving wheel on the middles and thus impairs the efficiency of the middle splitters.

Another problem associated with the existing middle splitter is that the guide, which is parallel to the slot, makes the entry of the middle into the splitter difficult. Furthermore, as the guide is rigidly mounted on the machine at a given distance from the conveyor belt, it does not allow for middles of different sizes and thicknesses to be easily processed. Thus larger middles will proceed through the splitter with greater difficulty as the guide cannot be adjusted.

SUMMARY OF THE INVENTION

The object of the present invention is to provide an improved meat processing machine, hereinafter called "middle splitter", for use to split middles of animals into loins and bellies.

More particularly, the object of the invention is to provide an improved middle splitter having an efficient middle conveying arrangement providing a good traction on the middles.

The object of the present invention is also to provide an improved middle splitter which adapts itself to middles of different width and thickness.

In accordance with the invention, this object is achieved by a middle splitter for use to process one half of a carcass of an animal, hereinafter called "middle", in such a manner as to split its middle into two parts, said middle having a shoulder-adjacent end and including half of the animal's spine.

This middle splitter comprises a work table having a longitudinal axis and a conveyor belt extending over said work table to move said carcass longitudinally in a forward direction with the shoulder-adjacent end of said middle positioned forwardly. This conveyor belt is longitudinally slotted.

The middle splitter also comprises a circular saw lying in a plane substantially perpendicular to the conveyor belt and parallel to said longitudinal axis. This saw extends in the slot of the conveyor belt and is positioned in such a manner as to cut the middle laid on the conveyor belt when the middle moves forward.

A guide extends from upstream of the saw down to the same with respect to the forward direction of said conveyor belt. This guide is parallel to said longitudinal axis and extends slightly above the conveyor belt to hold the middle flat against the conveyor belt while said middle is cut by the saw.

The middle splitter further comprises a caterpillar driving means extending from upstream of the saw down to and past the saw with respect to said forward direction. This caterpillar driving means is parallel to the conveyor belt and has a contour belt mounted onto a belt support of longitudinal shape having longitudinal sides and rounded ends. The contour belt has a series of adjacent peripheral protruding plates shaped and positioned to engage the middle adjacent the spine that is part thereof. The caterpillar driving means also has a first rotatably mounted shaft extending perpendicularly to the conveyor belt. This first rotatably mounted shaft engages positively the contour belt.

A motor drives the first rotatably mounted shaft into rotation, thereby driving the contour belt of the caterpillar driving means into rotation so that the longitudinal side of the contour belt nearest the saw moves in the same forward direction as the conveyor belt, whereby the caterpillar driving means pulls the middle forward toward the circular saw and pushes the spine toward the adjacent guide.

Last of all, the middle splitter comprises a pressure-exerting means for pushing the caterpillar driving means towards the guide in a direction substantially transverse to said longitudinal axis so that the caterpillar driving means exerts a pressure onto the spine to straighten it up while the middle is cut.

In accordance with a preferred embodiment of the invention, the belt support may include the first rotatably mounted shaft and a second rotatably mounted shaft perpendicular to the conveyor belt and substantially distanced along the longitudinal axis from the first rotatably mounted shaft so that the contour belt surrounds tightly the pair of first and second rotatably mounted shafts.

In accordance with another preferred embodiment of the invention, the guide may be supported by resilient means allowing said guide to move in a vertical manner when middles of different thickness are engaged in the machine. Such resilient means may comprise a spring loaded support near each longitudinal extremity of the guide, a pivoting connecting member pivotably attached to the guide and to the lower end of each support, and a joining arm pivotably attached to each connecting member. Thereby each extremity of the guide may move in a vertical manner depending on the thickness of the middle portion underneath the respective extremity of the guide.

Thus in accordance with the invention, there is provided a middle splitter with caterpillar driving means. This caterpillar driving means is a very efficient middle conveying arrangement as it provides good traction on said middles.

Thanks to its structure, this machine can adapt itself to middles of different width and thickness with the help of the pressure exerting means pushing on the caterpillar driving means. This adaptation is advantageously completed by the use of resilient means to support the guide.

BRIEF DESCRIPTION OF THE DRAWINGS

A non restrictive description of a preferred embodiment of the present invention will here be given with references to the appended drawings.

DETAILED DESCRIPTION OF A PREFERRED EMBODIMENT

Figure 1:
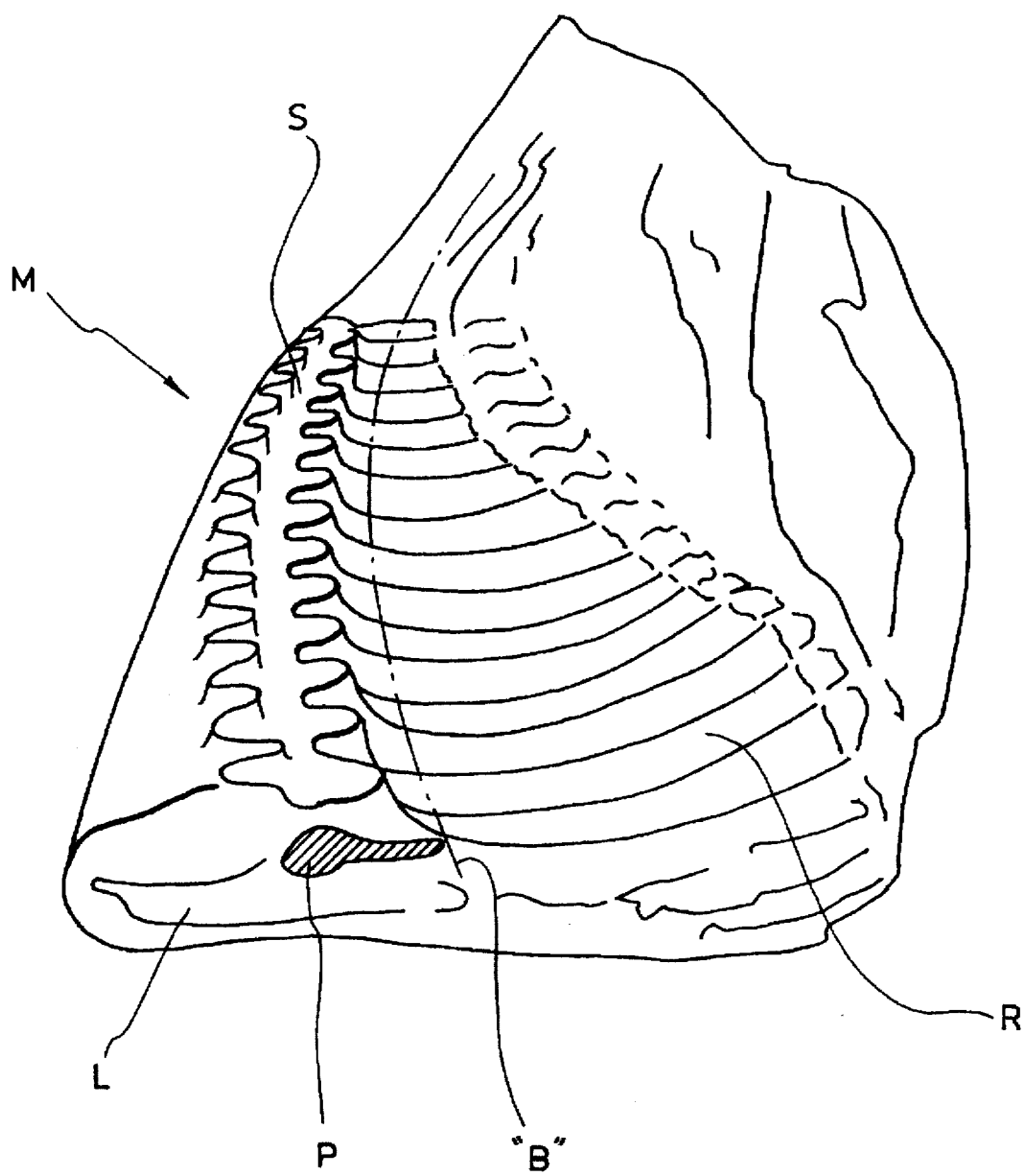
FIG. 1 is a schematic representation of a middle.
Figure 2:
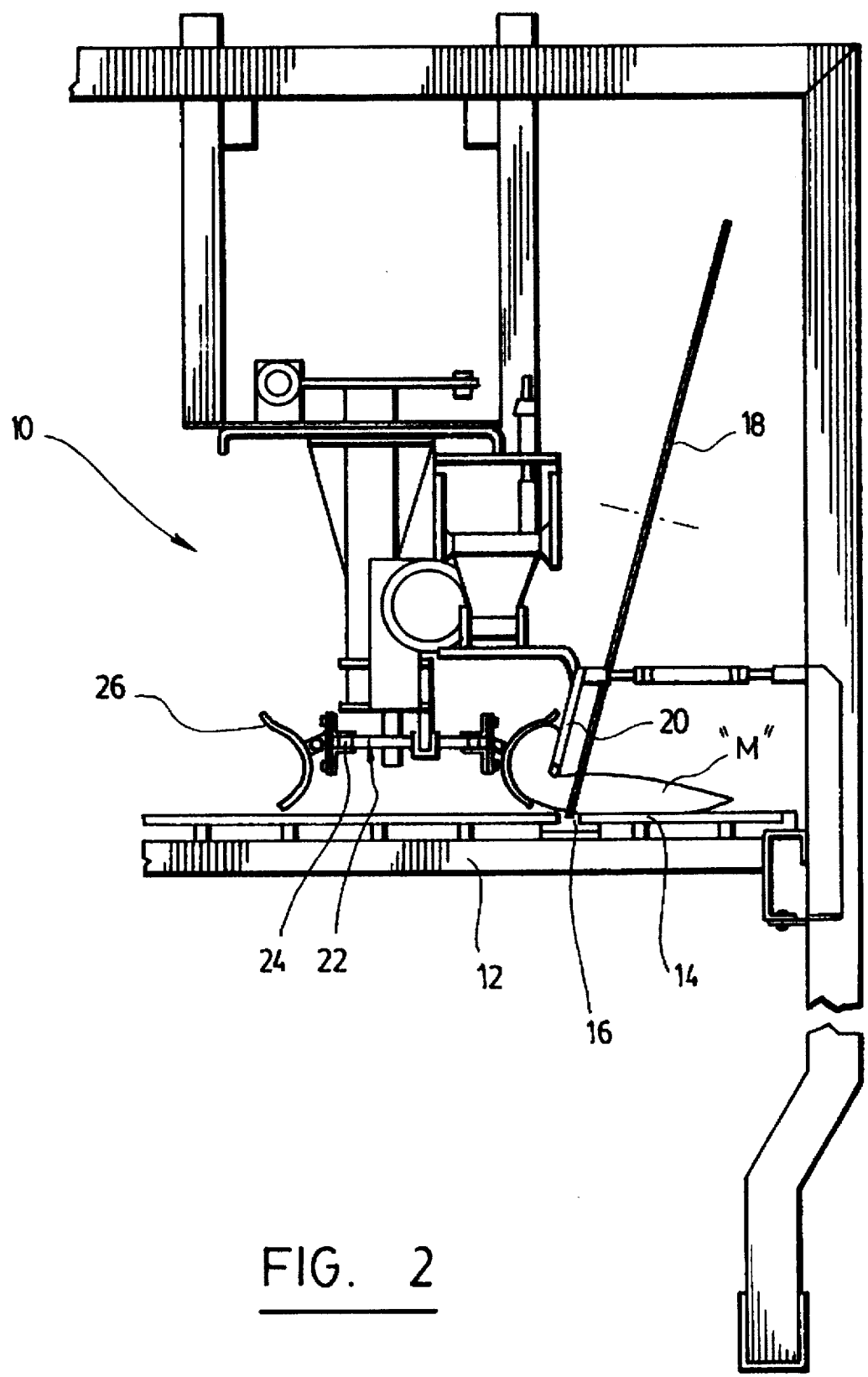
FIG. 2 is a front elevation view of a middle splitter according to the invention.

FIG. 2 is a front elevation view of a middle splitter according to the present invention. As is shown, the middle splitter 10 comprises a work table 12 which has a longitudinal axis "A", shown in FIG. 3, and a conveyor belt 14 which extends over the work table 12 to move the middle "M" longitudinally in a forward direction with the shoulder-adjacent end of the middle "M" positioned forwardly. The conveyor belt 14 has a longitudinal slot 16.

The middle splitter 10 also has a circular saw 18 which is in a plane almost perpendicular to the conveyor belt 14 and parallel to the longitudinal axis "A". The saw 18 extends in the slot 16 of the conveyor belt 14 and is positioned in such a manner as to cut the middle "M" laid on the conveyor belt 14 when the middle "M" moves forward.

The middle splitter 10 has a guide 20 which extends from upstream of the saw 18 down to the same with respect to the forward direction of the conveyor belt 14. The guide 20 is parallel to the longitudinal axis "A" and extends slightly above the conveyor belt 14 to hold the middle "M" flat against the conveyor belt 14 while the middle "M" is cut by the saw 18. If desired, a curved bar 21 can be located opposite of the guide 20, close to the saw 18, in order to distance the spine of the middle "M" from the saw 18 as it moves towards the same.

Preferably, the guide 20 has a portion 19 before the saw 18, that is at an angle with respect to the longitudinal axis "A" in order to ease the entrance and positioning of the middle "M".

Figure 5:
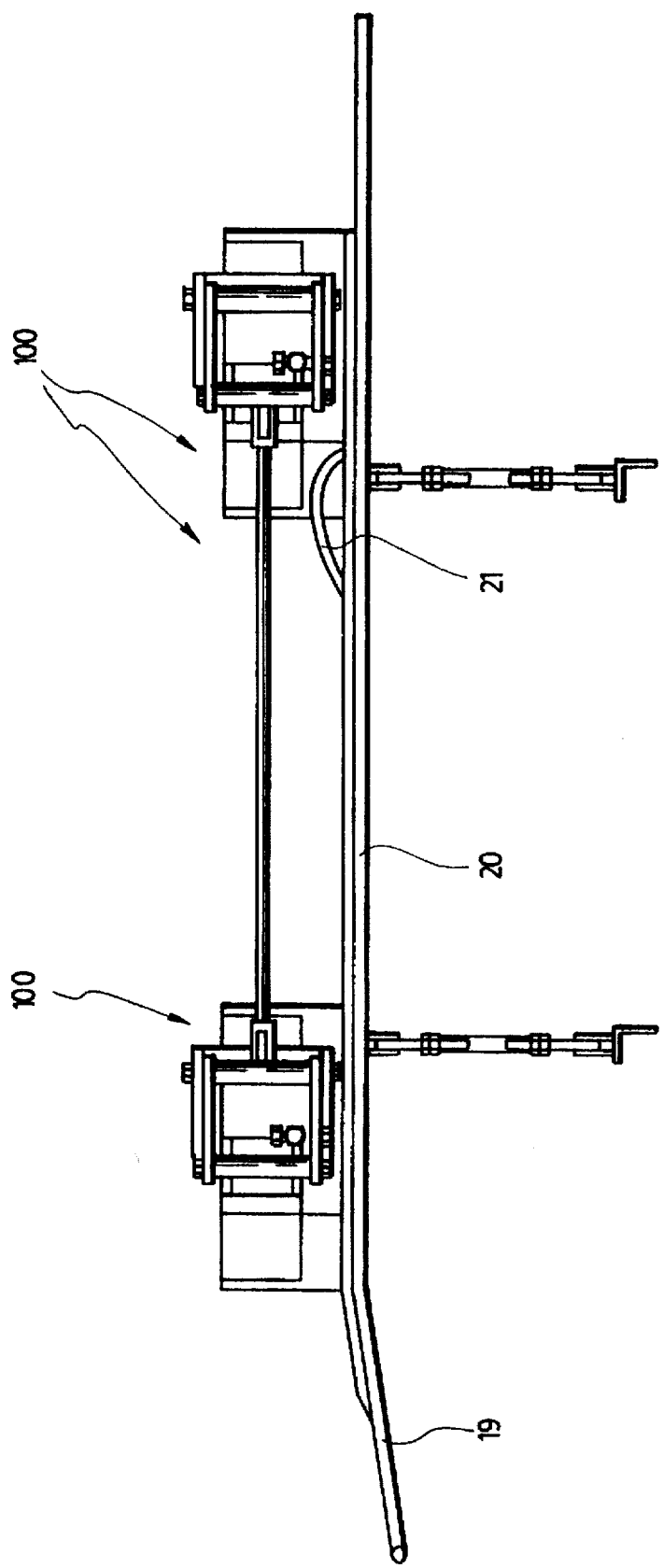
FIG. 5 is a top plan view of the guide shown in FIG. 2, combined with resilient means.
Figure 6:
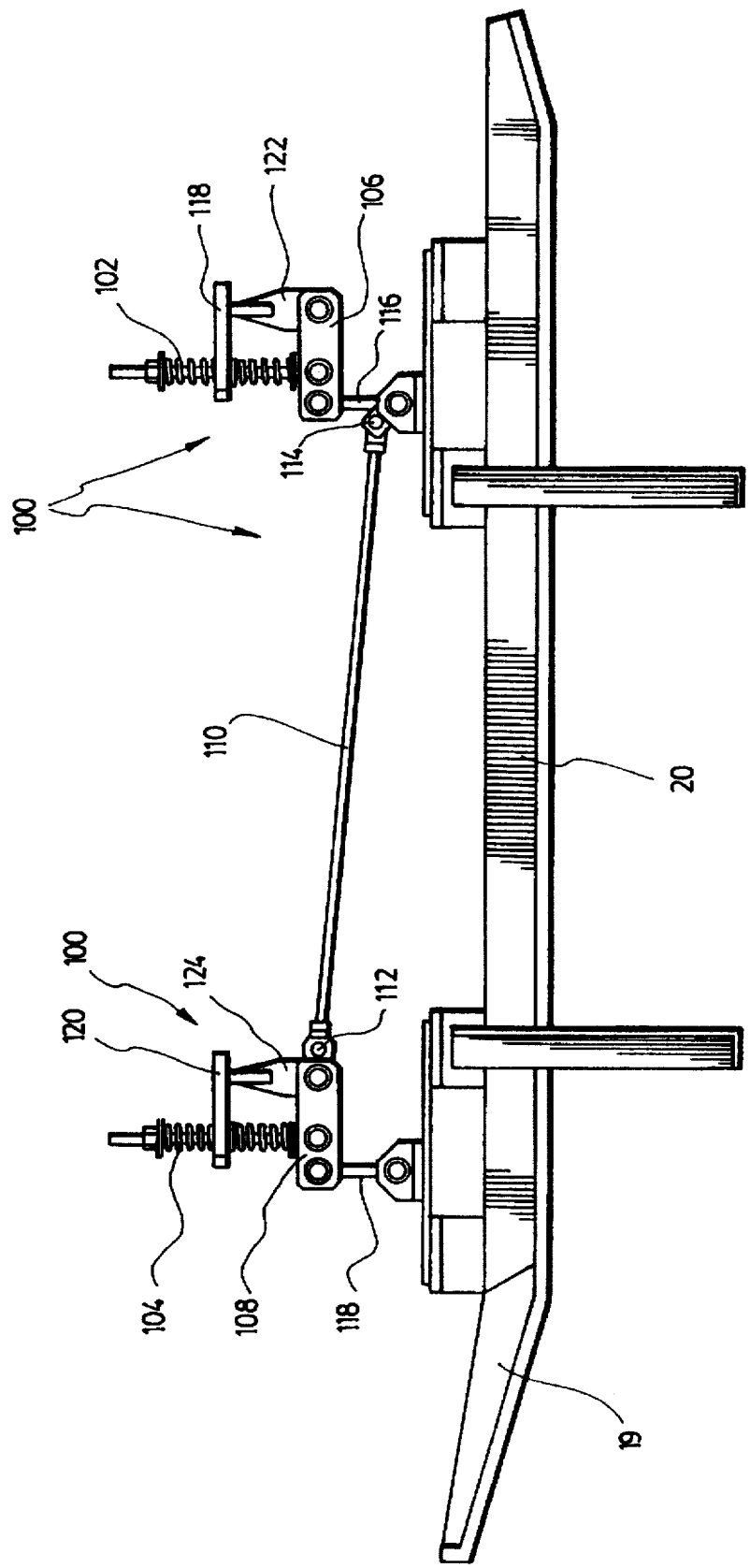
FIG. 6 is a side elevation view of the guide and resilient means shown in FIG. 5.
Figure 7:
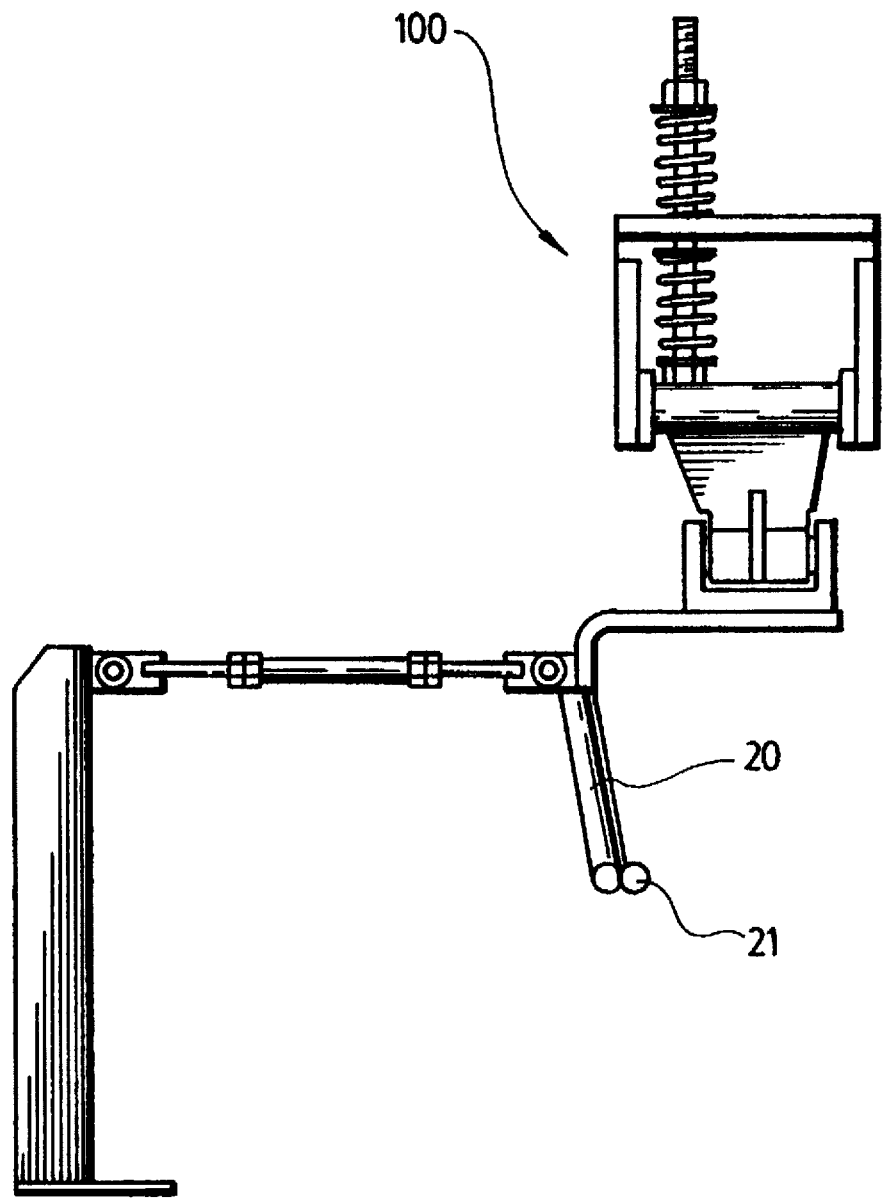
FIG. 7 is a front elevation view of the guide and resilient means shown in FIG. 5 and 6.

Also preferably, as shown in FIG. 5, 6 and 7, the guide 20 is supported by resilient means 100 allowing the guide 20 to move in a vertical manner when middles "M" of different thickness are engaged in the middle splitter 10.

The resilient means 100 comprises a spring loaded support 102, 104 near each longitudinal extremity of the guide 20 and a pivoting connecting member 106, 108 pivotably attached via short pivoting arm 116, 118 to the guide and to the lower end of each support 102, 104. The resilient means 100 also comprise a joining arm 110 pivotably attached to each connecting member 106, 108. More precisely, the pivoting connecting members 106, 108 are off centered with respect to the lower end of each respective support 102, 104. Both connecting members 106, 108 are offset in the same direction. The joining arm 110 is pivotably attached to the rear portion 112 of the connecting member 108 and is pivotably attached to the lower extremity 114 of the short pivoting arm 116. Tabs 122, 124 are pivotably attached to the rear portion of each connecting members 106, 108 and fixed to supporting plates 118, 120 through which pass the spring loaded supports 102, 104. As a result, each extremity of the guide 20 moves in a vertical manner depending on the thickness of the middle "M" portion passing underneath the same. Moreover, because of the joining arm 110, unwanted swinging movements of the guide 20 are prevented since the lower extremity 114 is maintained at a fixed distance from the rear portion 112 to which it is connected via the joining arm 110.

Figure 3:
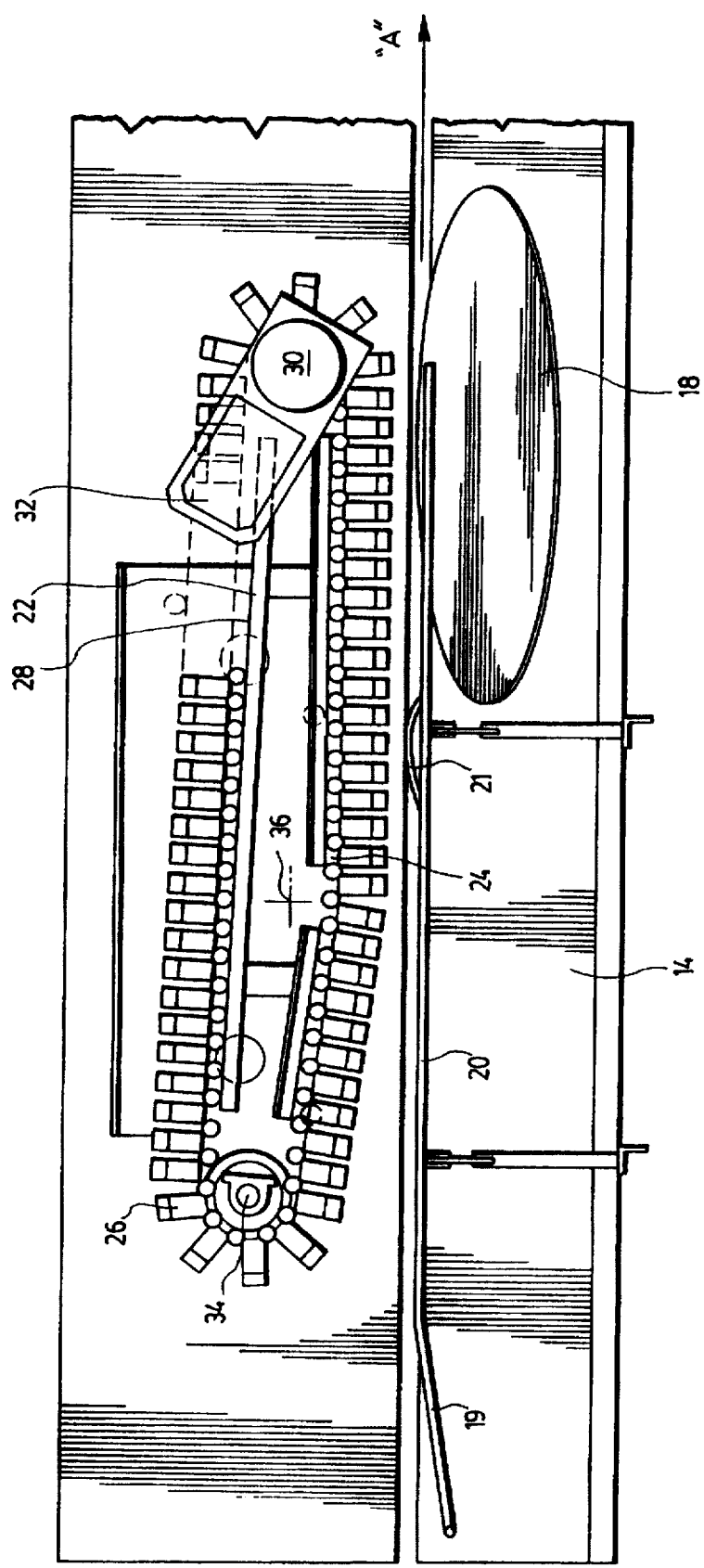
FIG. 3 is a top plan view of the caterpillar driving means and the guide of the middle splitter shown in FIG. 2.
Figure 8:
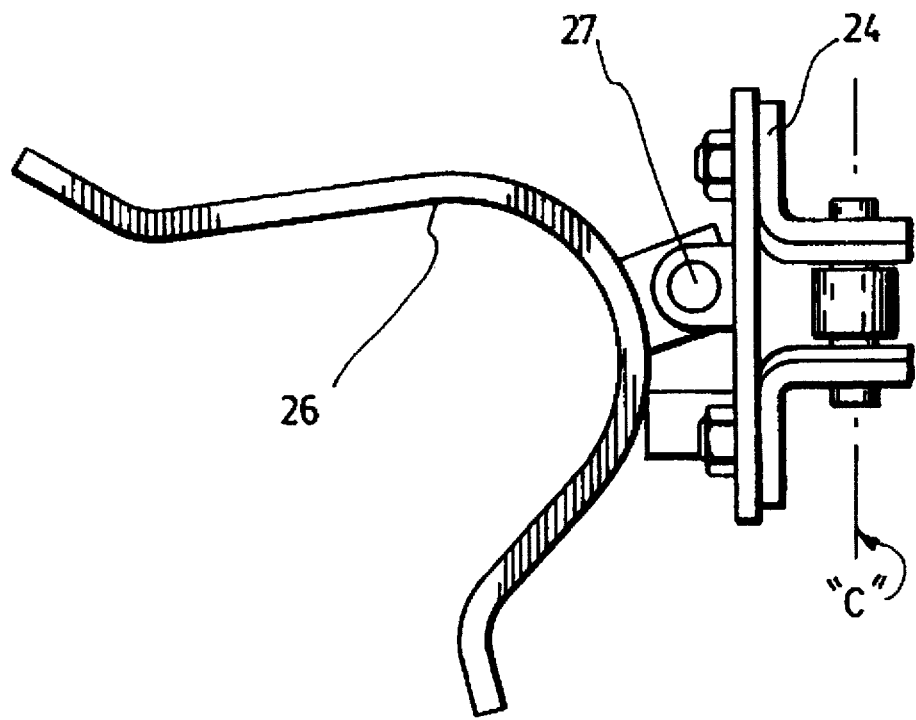
FIG. 8 is a side view of a preferred embodiment of a protruding plate as shown in FIG. 2.

Referring now to FIG. 3, the middle splitter 10 has a caterpillar driving means 22 which extends from upstream of the saw 18 down to and past the saw 18 with respect to the forward direction. The caterpillar driving means 22 is parallel to the conveyor belt 14 and has a contour belt 24 which is mounted onto a belt support 28. The belt support 28 has a longitudinal shape with longitudinal sides and rounded ends. The contour belt 24 is made of a plurality of adjacent units 24 attached to each other in such a manner as to pivot about a vertical axis "C". Each pivoting unit 24 has a peripheral protruding plate 26 shaped and positioned to engage the middle "M" adjacent the spine that is part thereof. Preferably, the plates 26 are pivotably mounted on the pivoting unit 24 about a horizontal axis parallel to the conveyor belt and have a curved shape, as shown in FIG. 8, so as make contact with a substantial part of the curved side of the middle "M".

The caterpillar driving means 22 also has a first rotatably mounted shaft 30 which extends perpendicularly to the conveyor belt 14. The first rotatably mounted shaft 30 engages positively the contour belt 24.

The caterpillar driving means 22 further has a second rotatably mounted shaft 34 which extends perpendicular to the conveyor belt 14. This second shaft is at a distance from the first rotatably mounted shaft 30, with respect to the longitudinal axis "A" so that the contour belt 24 surrounds tightly the pair of first and second rotatably mounted shafts 30, 34.

Advantageously, a third shaft 36 is rotatably mounted in between the first and second rotatably mounted shafts 30, 34. The first rotatably mounted shaft 30 is transversely offset away from the guide 20 so that the contour belt 24 bends partly around the third rotatably mounted shaft 36. Such structure eases entrance of the middle "M" into the middle splitter 10.

A motor 32 is provided to drive the first rotatably mounted shaft 30 into rotation and thus to drive the contour belt 24 of the caterpillar driving means 22 into rotation so that the longitudinal side of the contour belt 24 nearest the saw 18 moves in the same forward direction and preferably at the same speed as the conveyor belt 14. Thereby, the caterpillar driving means 22 pulls the middle "M" forward toward the circular saw 18 and pushes the spine toward the adjacent guide 20.

Figure 4:
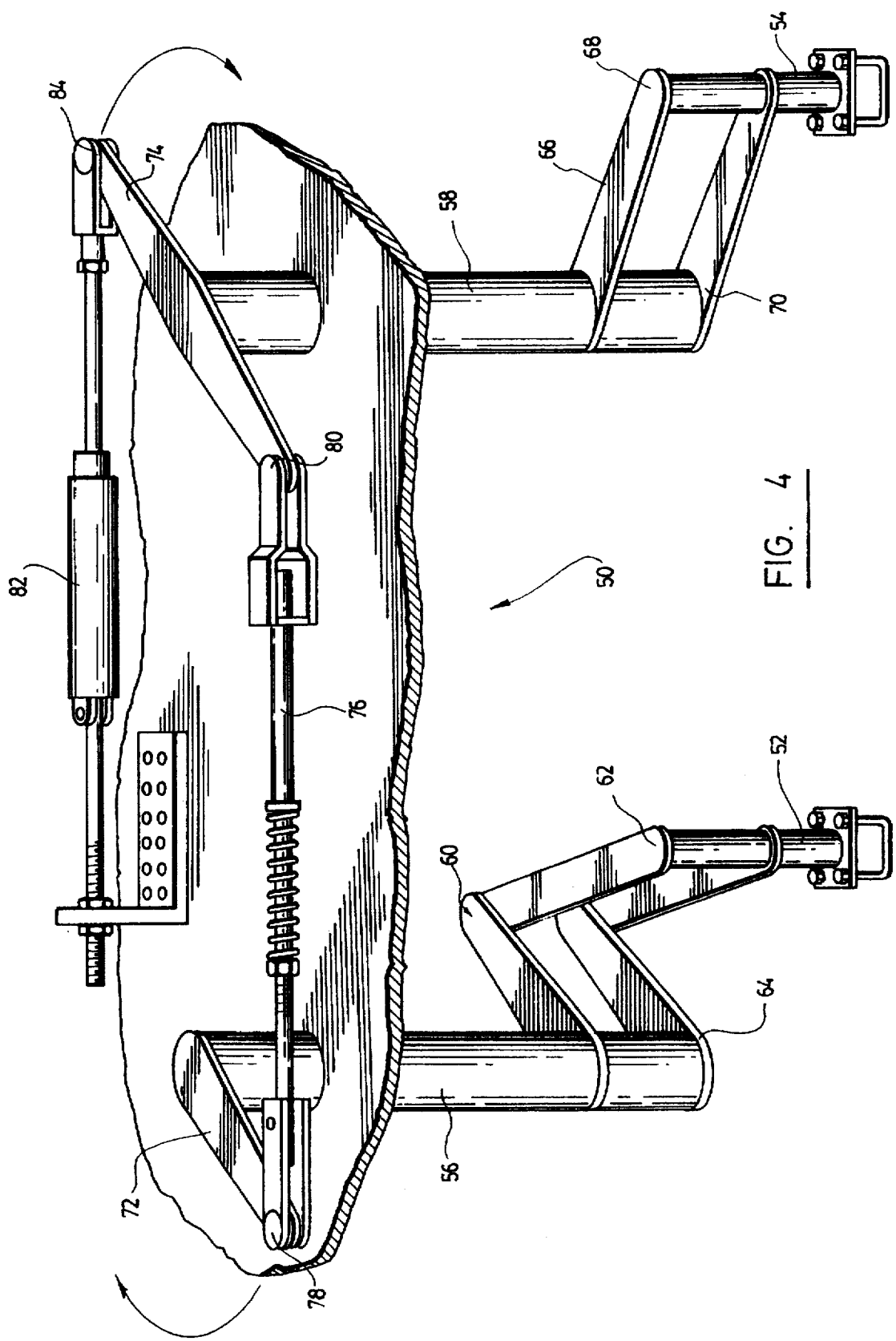
FIG. 4 is a perspective view of pressure exerting means of the middle splitter shown in FIG. 2.

Referring now to FIG. 4, pressure-exerting means 50 are provided to push the caterpillar driving means 22 towards the guide 20 in a direction substantially transverse to the longitudinal axis "A" so that the caterpillar driving means 22 exerts a pressure onto the spine of the middle "M" to straighten it up while the middle "M" is cut.

As is shown, the pressure exerting means 50 preferably comprises first and second posts 52, 54 fixed to the belt support in between the first and second shafts 30, 34 such posts 52, 54 are perpendicular to the conveyor belt 14. The pressure exerting means also comprises first and second rotating members 56, 58 which are supported over and perpendicularly to the work table 12. The rotating members 56, 58 each have an upper and a lower extremity.

A V-shaped joint arm 60 extends parallel to the work table 12 to connect the first rotating member 56 to the first post 52. The jointed arm 60 has a first end 62 fixed to the first post 52 and a second end 64 fixed to the lower extremity of the first rotating member 56. The joint of the jointed arm 60 is pointing away from the guide 20 and the extremity of the jointed arm 60 attached to the caterpillar driving means 22 is slanted with respect to the longitudinal axis "A" so that when it is pushed away from the guide 20 it rotates the first rotating member 56.

A straight arm 66 extends parallel to the work table 12 to connect the second rotating member 58 to the second post 54. The straight arm 66 has a first end 68 fixed to the second post 54 and a second end 70 fixed to the lower extremity of the second rotating member 58. The extremity of the arm 66 attached to the guide is slanted with respect to the longitudinal axis "A" so that when it is pushed away from the guide 20, it rotates the second rotating member 58 in the same direction as the first rotating member 56.

The pressure exerting means 50 also has first and second lever parts 72, 74 fixed respectively to the upper extremity of the first and second rotating member 56, 58. A spring loaded arm 76 extends along the longitudinal axis "A" and is fixed at one end to a first extremity 78 of the first lever part 72 and on another end to a first extremity 80 of the second lever part 74. The spring loaded arm 76 ensures that both rotating members 56, 58 rotate together in the same direction and at the same time although possibly over different distances. The difference in distances is compensated by compression or extension of the spring in the spring loaded arm 76.

Resistance means 82 are connected to the second extremity 84 of the second lever part 74 to provide a resisting force against any rotation caused by a distancing of the first and second posts 52, 54 from the guide 20 due to the varying width of the middle "M". Preferably, such resistance means 82 consists of an hydraulic cylinder 82 positioned along the longitudinal axis "A".

We claim:

1. A machine middle for use to process a carcass middle in such a manner as to split said middle into two parts, said middle having a shoulder-adjacent end and including half of the animal's spine, said machine comprising:

a work table having a longitudinal axis a conveyor belt extending over said work table to move said carcass longitudinally in a forward direction with the shoulder-adjacent end of said middle positioned forwardly, said conveyor belt being longitudinally slotted;

a circular saw lying in a plane substantially perpendicular to the conveyor belt and parallel to said longitudinal axis, said saw extending in the slot of the conveyor belt and being positioned in such a manner as to cut the middle laid on said conveyor belt when said middle moves forward;

a guide extending from upstream of the saw down to the same with respect to the forward direction of said conveyor belt, said guide being parallel to said longitudinal axis and extending slightly above the conveyor belt to hold the middle flat against said conveyor belt while said middle is cut by the saw;

a caterpillar driving means extending from upstream of the saw down to and past the saw with respect to said forward direction, said caterpillar driving means being parallel to the conveyor belt and having a contour belt mounted onto a belt support of longitudinal shape having longitudinal sides and rounded ends, said contour belt having a series of adjacent peripheral protruding plates shaped and positioned to engage the middle adjacent the spine that is part thereof, said caterpillar driving means also having a first rotatably mounted shaft extending perpendicularly to said conveyor belt, said first rotatably mounted shaft engaging positively said contour belt;

a motor for driving the first rotatably mounted shaft into rotation and thus for driving said contour belt of said caterpillar driving means into rotation so that the longitudinal side of the contour belt nearest the saw moves in the same forward direction as the conveyor belt, whereby said caterpillar driving means pulls said middle forward toward the circular saw and pushes the spine toward the adjacent guide; and pressure-exerting means for pushing the caterpillar driving means towards the guide in a direction substantially transverse to said longitudinal axis so that said caterpillar driving means exerts a pressure onto the spine to straighten it up while the middle is cut.

2. A machine according to claim 1 wherein said protruding plates are mounted pivotably around an axis perpendicular to the contour belt and parallel to the work table and also around the longitudinal axis, said protruding plates having a curved clamp-shape opened toward the guide and partially encompassing the middle.

3. A machine according to claim 1 wherein said belt support includes said first rotatably mounted shaft and a second rotatably mounted shaft perpendicular to said conveyor belt and substantially distanced along said longitudinal axis from the first rotatably mounted shaft so that the contour belt surrounds tightly the pair of first and second rotatably mounted shafts.

4. A machine according to claim 2 wherein said caterpillar driving means has a third rotatably mounted shaft in between the first and second rotatably mounted shafts, the first rotatably mounted shaft being transversely offsetted away from the guide so that the contour belt bends partly around the third rotatably mounted shaft in order to ease entrance of the middle into the middle splitter.

5. A machine according to claim 1 wherein said pressure exerting means comprises:

first and second post perpendicular to the conveyor belt and fixed to the belt support in between the longitudinal sides and rounded ends of the belt support;

first and second rotating member supported over and perpendicularly to the work table, said rotating members having an upper and a lower extremity;

a jointed arm parallel to the work table, said jointed arm having a first end fixed perpendicularly to the first post and a second end fixed perpendicularly to the lower extremity of the first rotating member;

a straight arm parallel to the work table, said straight arm having a first end fixed perpendicularly to the second post and a second end fixed perpendicularly to the lower extremities of the second rotating member;

first and second lever part fixed respectively to the upper extremities of the first and second rotating member;

a spring loaded arm extending along said longitudinal axis and fixed at one end to a first extremity of the first lever part and on another end to a first extremity of the second lever part;

resistance means connected to the second extremity of the second lever part to provide a resisting force against the rotation caused by a distancing of the first and second posts from the guide due to the varying width of the middle.

6. A machine according to claim 2 wherein said pressure exerting means comprises:

first and second post fixed to the belt support in between the first and second rotatably mounted shafts inside the contour belt and perpendicular to the conveyor belt;

first and second rotating member supported over and perpendicularly to the work table, said rotating members having an upper and a lower extremity;

a jointed arm parallel to the work table, said jointed arm having a first end fixed perpendicularly to the first post and a second end fixed perpendicularly to the lower extremity of the first rotating member;

a straight arm parallel to the work table, said straight arm having a first end fixed perpendicularly to the second post and a second end fixed perpendicularly to the lower extremity of the second rotating member;

first and second lever part fixed respectively to the upper extremity of the first and second rotating member;

a spring loaded arm extending along said longitudinal axis and fixed at one end to a first extremity of the first lever part and on another end to a first extremity of the second lever part;

resistance means connected to the second extremity of the second lever part to provide a resisting force against the rotation caused by a distancing of the first and second posts from the guide due to the varying width of the middle.

7. A machine according to claim 5 wherein said resistance means is a hydraulic cylinder.

8. A machine according to claim 6 wherein said resistance means is a hydraulic cylinder.

9. A machine according to claim 1 wherein said guide has a portion before the saw at an angle with respect to said longitudinal axis to ease entrance and positioning of the middle.

10. A machine according to claim 2 wherein said guide has a portion before the saw at an angle with respect to said longitudinal axis to ease entrance and positioning of the middle.

11. A machine according to claim 1 wherein said guide is supported by resilient means allowing said guide to move in a vertical manner when middles of different thickness are engaged in the machine.

12. A machine according to claim 2 wherein said guide is supported by resilient means allowing said guide to move in a vertical manner when middles of different thickness are engaged in the machine.

13. A machine according to claim 11 wherein said resilient means comprises:

a spring loaded support near each longitudinal extremity of the guide;

a pivoting connecting member pivotably attached to the guide and to the lower end of each support;

a joining arm pivotably attached to each connecting member;

whereby each extremity of the guide moves in a vertical manner depending on the thickness of the middle portion underneath the respective extremity of the guide.

14. A machine according to claim 12 wherein said resilient means comprises:

a spring loaded support near each longitudinal extremity of the guide;

a pivoting connecting member pivotably attached to the guide and to the lower end of each support;

a joining arm pivotably attached to each connecting member;

whereby each extremity of the guide moves in a vertical manner depending on the thickness of the middle portion underneath the respective extremity of the guide.

15. A machine according to claim 4 wherein said guide further comprises a block located on the side opposite said saw, adjacent said saw, to distance the spine from said saw.

16. A machine according to claim 15 wherein said pressure exerting means comprises:

first and second post fixed to the belt support in between the first and second rotatably mounted shafts inside the contour belt and perpendicular to the conveyor belt;

first and second rotating member supported over and perpendicularly to the work table, said rotating members having an upper and a lower extremity;

a jointed arm parallel to the work table, said jointed arm having a first end fixed perpendicularly to the first post and a second end fixed perpendicularly to the lower extremity of the first rotating member;

a straight arm parallel to the work table, said straight arm having a first end fixed perpendicularly to the second post and a second end fixed perpendicularly to the lower extremity of the second rotating member;

first and second lever part fixed respectively to the upper extremity of the first and second rotating member;

a spring loaded arm extending along said longitudinal axis and fixed at one end to a first extremity of the first lever part and on another end to a first extremity of the second lever part;

resistance means connected to the second extremity of the second lever part to provide a resisting force against the rotation caused by a distancing of the first and second posts from the guide due to the varying width of the middle.

17. A machine according to claim 16 wherein said guide is supported by a resilient means allowing said guide to move in a vertical manner when middles of different thickness are engaged in the machine.

18. A machine according to claim 17 wherein said resilient means comprises:

a spring loaded support near each longitudinal extremity of the guide;

a pivoting connecting member pivotably attached to the guide and to the lower end of each support;

a joining arm pivotably attached to each connecting member;

whereby each extremity of the guide moves in a vertical manner depending on the thickness of the middle portion underneath the respective extremity of the guide.

19. A machine according to claim 18 wherein said guide has a portion before the saw at an angle with respect to said longitudinal axis to ease entrance and positioning of the middle.

20. A machine according to claim 19 wherein said protruding plates are mounted pivotably around an axis perpendicular to the contour belt and parallel to the work table and also around the longitudinal axis, said protruding plates having a curved clamp-shape opened toward the guide and partially encompassing the middle.

* * * * *